United States Patent [19]

Shimizu et al.

[11] 4,358,800
[45] Nov. 9, 1982

[54] OPERATION CONTROL DEVICE FOR TAPE RECORDERS

[75] Inventors: Ryota Shimizu, Toyonaka; Toshiharu Sasaki, Kawanishi; Naoyuki Ohara, Yokaichi, all of Japan

[73] Assignee: Matsushita Electric Industrial Co., Ltd., Osaka, Japan

[21] Appl. No.: 139,221

[22] Filed: Apr. 11, 1980

[51] Int. Cl.³ .................. G11B 15/32; G11B 15/28
[52] U.S. Cl. ........................... 360/90; 242/201; 360/74.1
[58] Field of Search ............ 360/90, 71, 74.1–74.3, 360/73; 242/201–202, 191, 193, 208

[56] References Cited
U.S. PATENT DOCUMENTS

| | | | |
|---|---|---|---|
| 2,705,639 | 4/1955 | Lekas | 360/74.1 |
| 2,974,537 | 3/1961 | Wheeler | 360/90 |
| 3,718,777 | 2/1973 | Tupaj et al. | 360/90 |
| 3,869,100 | 3/1975 | Flippen, Jr. | 242/201 |
| 4,106,728 | 8/1978 | Richt | 360/74.2 |
| 4,131,922 | 12/1978 | Yoshida et al. | 360/90 |

Primary Examiner—Alfred H. Eddleman
Attorney, Agent, or Firm—Wenderoth, Lind & Ponack

[57] ABSTRACT

A magnetic tape recording and/or reproducing apparatus has a motor driven differential mechanism having racks and pinions, an operatively activatable electromagnetic mechanism having movable levers and a plurality of magnetic coils for moving the levers for engagement with the differential mechanism and a tape transport system adapted to cooperate with the differential mechanism so as to be placed in a desired tape transport operation in accordance with the activational condition of the coils. The apparatus also has a pair of one-way clutches for transmitting the driving power of the motor selectively to the differential mechanism or to the tape transport system in accordance with the rotational direction of the motor.

6 Claims, 7 Drawing Figures

OPERATION CONTROL DEVICE FOR TAPE RECORDERS

BACKGROUND OF THE INVENTION

This invention relates to a tape recording and/or reproducing apparatus, and more particularly to an apparatus wherein a tape transport system is placed into a desired tape transport operation by means of an electromagnetic device driven by a motor.

It is known that there are three types of operation control devices for tape recorders on the market. One type of such device is a manually driven one. Another one is a solenoid driven one, and the other is a motor driven one. Operation control devices of the manually driven type provide operating buttons and associated linkage and other movable members for holding a tape transport system in a desired operation condition. Tape recorders having an operation control device of this type are inexpensive to manufacture; however, they are not free from drawbacks in that the operating buttons require man power enough to move the associated linkage and other movable members. Tape recorders having an operation control device of the solenoid driven type overcome the above drawbacks; however, it is necessary to provide an electric power system to actuate solenoids which consume electric power to hold the tape transport system in a desired operation condition, and also it is difficult to provide such a solenoid driven device which is compactly constructed.

In order to solve these problems, an improved type of operation control device has been developed wherein the movements to place a tape transport system in a desired operation condition are accomplished by motor power. Although such improved operation control devices solve the foregoing problems, they are not entirely free from drawbacks. For example, they are apt to have a complicated structure for selectively moving mechanical elements into and out of engagement with a motor; they are apt to be deficient in reliability of operation due to the complicated structure; and they are apt to be deficient in failing to have quick response operation since the motor drives the operation control device concurrently with the driving of the tape transport system.

In addition to the above problems, these prior art devices have a distinctive drawback in that operation control devices make unpleasant noises during their operation which are caused by return springs.

Accordingly, it is readily evident that the operation control of tape recorders must be accomplished with a smooth and quiet operation of the control device, with less consumption of electric power, and in a commercial product, by a structure which can be compactly and simply constructed. Accordingly, there has been a need for an improved operation control device for tape recorders of the kind described herein.

SUMMARY OF THE INVENTION

It is, therefore, an object of this invention to provide an operation control device for tape recorders which is operated with less consumption of electric power.

Another object of this invention is to provide an operation control device for tape recorders which is compactly and simply constructed.

Still another object of this invention is to provide an operation control device for tape recorders which can achieve a smooth, reliable, quick and quiet operation.

A further object of this invention is to provide an operation control device for tape recorders having a motor which is highly efficiently used for driving the operation control device by means of a power control device including a pair of one way clutches.

These objects are achieved according to this invention by providing an operation control device which is used for tape recorders, and which comprises a power means, a fast displacement means driven by the power means, a second displacement means adapted to shift a tape transport mechanism of the apparatus into and out of operation, a coupling means adapted to provide constant engagement of the fast displacement means with the second displacement means, the coupling means being positionable between an operative position where the second displacement means is moved in response to the movement of the fast displacement means and an inoperative position where the second displacement means does not move in response to the movement of the fast displacement means, a control means and selectively and operatively activated for engagement with the coupling means so as to place the coupling means in the operative position thereof, whereby the tape transport mechanism is shifted into and out of operation in response to the activation of the control means and with the constant engagement of the fast displacement means with the second displacement means.

The foregoing objects are also achieved according to this invention by providing an operation control device which is used for tape recorders, and which comprises a tape transport means for transporting a magnetic tape, a shifting means for shifting the tape transport mechanism into and out of operation, a reversible motor, a first control means for controlling the rotational directions of the motor, a second control means adapted to transmit the driving power of the motor in a normal rotational direction to the tape transport means and to transmit the driving power of the motor in a reverse rotational direction to the shifting means, whereby the tape transport means and the shifting means are driven by the motor respectively in accordance with the respective rotational directions of the motor.

Further objects and advantages of this invention will become apparent from the following detailed description considered in connection with the accompanying drawings.

DETAILED DESCRIPTION OF A PREFERRED EMBODIMENT

Figure 1:
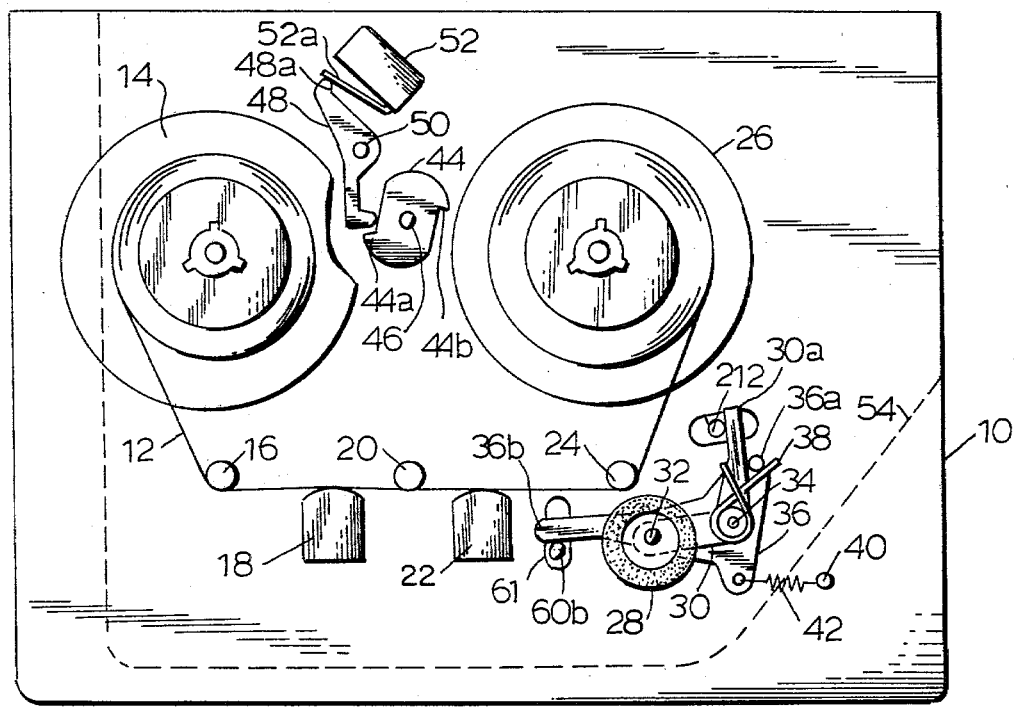
FIG. 1 is a schematic top plan view of an example of an operation control device for tape recorders according to this invention in an inoperative state.

Referring now to the drawings, there will be described one example of an operation control device for tape recorders according to this invention.

As shown in FIG. 1, a base chassis, which is made of mild steel, is indicated by reference numeral 10. A magnetic tape 12 extending between a supply reel 14 and a take-up reel 26 is guided about a tape guide 16, past an erasure head 18, a tape guide 20 and a record and/or reproducing head 22 which are fixedly mounted on the base chassis 10, and is arranged to engage with a tape drive capstan 24 rotatably mounted on the base chassis 10. A pressure roller 28 is rotatably mounted on a shaft 32 on a pressure roller lever 30. The pressure roller lever 30 and a lever 36 are respectively pivotally supported on a shaft 34 fixed on the base chassis 10. A torsion spring 38 is connected between a projection 36a on the lever 36 and one end portion 30a of the lever 30 to urge the projection 36a in a direction to abut the one end portion 30a. A spring 42 is connected between a pin 40 fixed on the base chassis 10 and the lever 36 to urge the lever 36 in the counterclockwise direction for providing a small gap between the tape drive capstan 24 and the pressure roller 28 in association with a mechanism described below. A switch cam 44 having a detent face 44a and an opposite detent face 44b is connected to a cam shaft 46. A switch lever 48 is pivotally supported on a shaft 50 fixed on the base chassis 10 and abuts the peripheral surface of the switch cam 44 and a resilient actuator 52a of a microswitch 52 of a normally open type which acts to urge the switch lever 48 in the counterclockwise direction by means of a spring element forming a part thereof. The reels 14 and 16 are rotatably supported on reel drive turntables described below respectively. A sub-chassis 54 shown by a dotted line is arranged under the base chassis 10.

Figure 2:
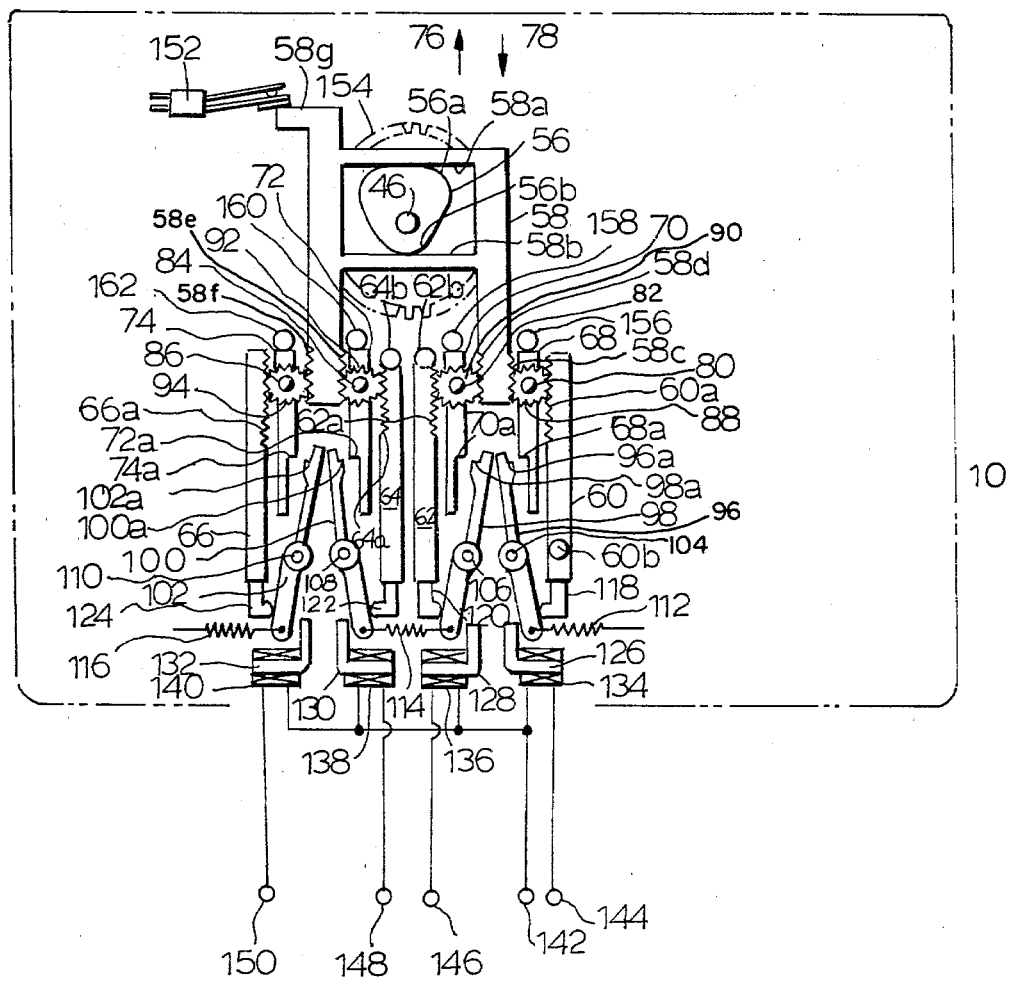
FIG. 2 is a schematic top plan view of an operation control mechanism which is arranged on the back side of the base chassis of FIG. 1.

Referring to FIG. 2, a triangular cam 56 having a maximum radius portion 56a and a minimum radius portion 56b is connected to the cam shaft 46 which is rotatably mounted on the base chassis 10 and forms part of a power means for the operation control device. A cam follower 58 constituting a first displacement means, a play rod 60, a fast forward rod 62, a rewind rod 64, a record rod 66, each constituting a respective second displacement means, and differential rods 68, 70, 72 and 74 are slidably supported on the back side of the base chassis 10 to move in the direction shown by arrows 76 and 78 by means of a guide mechanism not shown. The cam follower 58 has a square hole including surfaces 58a and 58b arranged to abut the cam surface of the triangular cam 56 respectively. The cam follower 58 also has racks 58c, 58d, 58e and 58f on the outside edges of projections thereof and has a further projection 58g.

Pinions 88, 90, 92 and 94 are rotatably mounted on shafts 80, 82, 84 and 86 respectively, and these shafts are fixed on the differential rods 68, 70, 72 and 74 respectively. The pinions 88, 90, 92 and 94 mesh with racks 58c, 58d, 58e and 58f of the cam follower 58 respectively. A rack 60a on the play rod, a rack 62a on the fast forward rod 62, a rack 64a on the rewind rod, and a rack 66a on the record rod mesh with the pinions 88, 90, 92 and 94 respectively. The rack 58c, the differential rod 96 with pinion 88, and rack 60a together constitute coupling means coupling follower 58 to play rod 60, and corresponding racks, differential rods and pinions coupling follower 58 to fast forward rod 62, rewind rod 64 and record rod 66 constitute coupling means for these rods. The play rod 60 mounts has a pin 60b thereon which extends through a slot 61 (not shown in FIG. 2 but in FIG. 1) in the base chassis 10 to engage with the projection 36b of the lever 36 shown in FIG. 1. The fast forward rod 62 has a pin 62b thereon which extends down. The rewind rod 64 mounts a pin 64b which extends below.

Levers made of mild steel 96, 98, 100 and 102 are pivotally supported on shafts 104, 106, 108 and 110, respectively, which are fixed on the base chassis 10, and which are made of mild steel. The levers 96, 98, 100 and 102 have detent faces 96a, 98a, 100a and 102a on their ends respectively. A spring 112 connected between the lever 96 and the base chassis 10 acts to urge the former in the counterclockwise direction. A spring 114 connected between the lever 98 and the lever 100 acts to urge the former in the clockwise direction and the latter in the counterclockwise direction. A spring 116 connected between the lever 102 and the base chassis 10 acts to urge the former in the clockwise direction. Stops 118, 120, 122 and 124 are secured to the base chassis 10 to stop the pivotal movement caused by the springs 112, 114 and 116 at the positions shown in FIG. 2. Magnetic cores 126, 128, 130 and 132 are fixedly arranged on the base chassis 10 to oppose the levers 96, 98, 100 and 102 respectively by means of a fixing means not shown.

Magnetic coils 134, 136, 138 and 140 are provided on the magnetic cores 126, 128, 130 and 132 respectively to produce electro-magnetic forces for moving the levers 96, 98, 100 and 102 respectively the respective pairs of coils and levers each constituting a control means for the corresponding differential rod. The magnetic force is so generated in the case of the magnetic coil 134 is such as for instance, that a magnetic flux runs through the magnetic core 126, the lever 96, the shaft 104 and the base chassis 10. Four lead wires chosen from each of four pairs of two lead wires of the magnetic coils 134, 136, 138 and 140 are terminated at a terminal 142, and the other respective four lead wires are terminated at terminals 144, 146, 148 and 150 respectively. A leaf switch 152 is mounted on the base chassis 10 in a position to be actuated by the projection 58g of the cam follower 58 in accordance with a movement of the cam follower 58 in the direction shown in the arrow 76. A gear 154 is fixedly mounted on the triangular cam 56.

Stops 156, 158, 160 and 162 are fixed on the base chassis 10 and arranged to abut end portions of the differential rods 68, 70, 72 and 74 respectively. On the other hand the stops 118, 120, 122 and 124 described above are arranged to abut end portions of the rods 60, 62, 64 and 66.

The arrangement of these stops is as follows. It is known that in the operation of a so called differential mechanism, that the differential rod 68 is brought to a position relative to the respective positions of the cam follower 58 and the play rod 60. A first position, that is one extreme position of the cam follower 58 in the movement in the direction shown by the arrow 76, is shown in FIG. 2. At this first position of the cam follower 58, the differential rod 68 is restricted in its movement in the direction shown by the arrow 76 by the stops 156, and in its movement in the direction shown by the arrow 78 by the play rod 60 which is restricted in its movement in the same direction by the stops 118.

When the cam follower is in the first position aforesaid and the differential rod 68 is restricted in its movement by the stops 156 and 118, the lever 96 can be moved clockwisely by electro-magnetic power produced by an activation of the magnetic coil 134 for engagement of the detent face 96a of the differential lever 96 with a detent face 68a of the play rod 68. The stops 120, 158, 122, 160, 124 and 162 serve for restricting the movements of the rods 62, 70, 64, 72, 66 and 74 respectively the same as the stops 156 and 118 as aforesaid.

Figure 3:
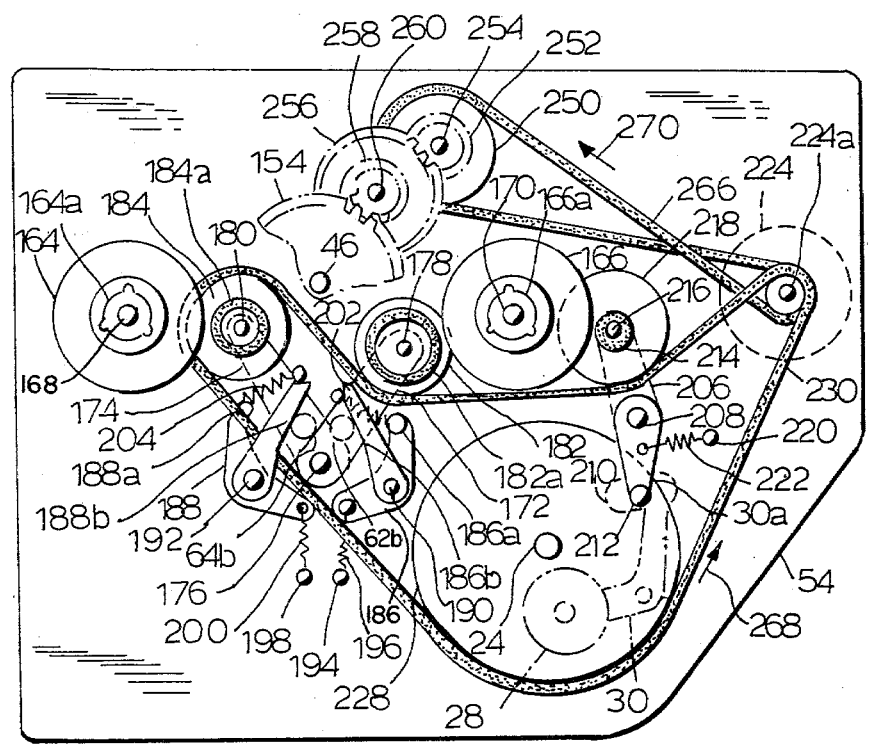
FIG. 3 is a schematic top plan view of a mechanism for driving reel drive turntables and a mechanism for driving a triangular cam.

Referring now to FIG. 3, a supply reel drive turntable 164 having an engagable portion 164a and a take-up reel drive turntable 166 having an engagable portion 166a are rotatably mounted on reel shafts 168 and 170 respectively, and both shafts 168 and 170 are fixed on the sub-chassis 54. Arms 172 and 174 are pivotally supported on a shaft 176 fixed on the sub-chassis 54. An idler 182 having a rubber tire 182a is rotatably mounted on a shaft 178 fixed on the arm 172. An idler 184 having a rubber tire 184a is rotatably mounted on a shaft 180 fixed on the arm 174. Levers 186 and 188 are pivotally supported on shafts 190 and 192, respectively, which are fixed on the sub-chassis 54. The lever 186 has a projection 186a and an edge 186b and is urged counterclockwise by a spring 196 which is connected between the lever 186 and a pin 194 fixed on the sub-chassis 54. The lever 188 has a projection 188a and an edge 188b and is urged clockwise by a spring 200 which is connected between the lever 188 and a pin 198 fixed on the sub-chassis 54. A spring 202 is connected between the projection 186a and the arm 172, and a spring 204 is connected between the projection 188a and the arm 174. Pivotal movement of the lever 186 caused by the spring 196 is limited by abutment of the edge 186b thereof against the pin 62b of the fast forward rod 62 which is in the position shown in FIG. 2. Pivotal movement of the lever 188 caused by the spring 200 is limited by abutment of the edge 188b thereof against the pin 64b of the rewind rod 64 which is in the position shown in FIG. 2. The arm 172 abuts the projection 186a by the biasing force of the spring 202 so as to position the rubber tire 182a adjacent to the turntable 166 with a small gap therebetween. The arm 174 abuts the projection 188a by the biasing force of the spring 204 so as to position the rubber tire 184a adjacent to the turntable 164 with a small gap therebetween.

A lever 206 is pivotally supported by a shaft 208 fixed on the sub-chassis 54, and has a pin 212 arranged to extend through a slot 210 in the base chassis 10 (as best shown in FIG. 1) for engagement with the end portion 30a of the lever 30. A rubber tire idler 214 and a pulley 218 are coupled concentrically by well-known frictional coupling means (not shown) which includes a felt and a spring, and are rotatably mounted on a shaft 216 fixed on the lever 206. The lever 206 is urged counterclockwise by a spring 222 connected between the lever 206 and a pin 220 fixed on the sub-chassis 54. Pivotal movement of the lever 206 caused by the spring 222 is limited by abutment of the pin 212 against the end portion 30a of the lever 30 represented by two-dot chain lines since the urging force of the spring 42 shown in FIG. 1 is greater than that of the spring 222 to cause the projection 36b shown in FIG. 1 to engage with the pin 60b. A motor 224 is mounted on the back plane of the sub-chassis 54. A first pulley 232 and a second pulley 234 (as best shown in FIG. 4) are mounted on an output shaft 224a of the motor 224, and each of the pulleys includes a one-way clutch therein, hereinafter described in more detail.

The tape drive capstan 24 is rotatably mounted on the base chassis 10 and the sub-chassis 54 by means of radial bearings and a thrust bearing which are not shown. A flywheel 228 is fixedly mounted on the capstan 24. A belt 230 is wrapped around the first pulley 232 (as best shown in FIG. 4), the pulley 218, the idlers 182 and 184, and the flywheel 228.

A pulley 250 having a pinion 252 fixedly mounted thereon is rotatably mounted on a shaft 254 fixed on the sub-chassis 54. A gear 256 rotatably mounted on a shaft 260 fixed on the sub-chassis 54 meshes with the pinion 252. A pinion 258 fixedly mounted on the gear 256 meshes with the gear 154 shown in FIG. 2. A belt 266 is connected between the pulley 250 and the second pulley 234 (as best shown in FIG. 4). The motor 224 and the elements connecting it to the gear 154 for driving the cam 56 form the rest of the power means.

Figure 4:
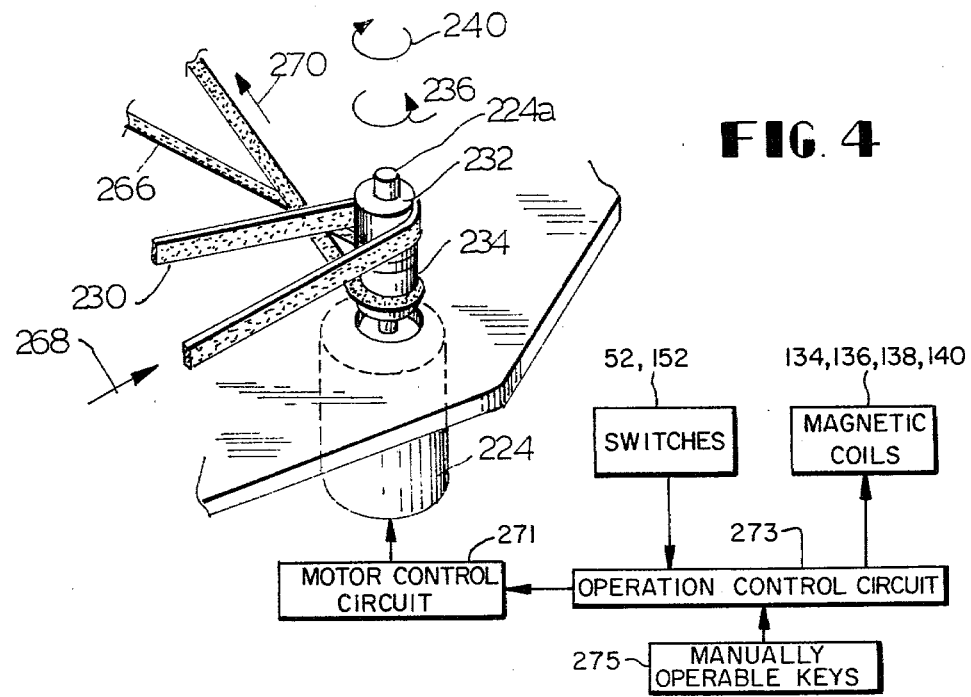
FIG. 4 is a perspective view of a motor power control mechanism having a pair of one-way clutches.

Referring to FIG. 4, when the motor 224 is rotating in a normal or counterclockwise direction represented by the arrow 236, the one-way clutch included in the first pulley 232 will engage the first pulley 232 with the output shaft 224a, and the one-way clutch included in the second pulley 234 will disengage the second pulley from the output shaft 224a. When the motor 224 is rotating in a reverse or clockwise direction represented by the arrow 240, the one-way clutch included in the second pulley 234 will engage the second pulley 234 with the output shaft 224a, and the one-way clutch included in the first pulley 232 will disengage the first pulley from the output shaft 224a. Thus, the belt 230 is moved in a direction represented by an arrow 268 by the motor 224 when it rotates counterclockwise, and the belt 266 is moved in a direction represented by the arrow 270 by the motor 224 when it rotates clockwise. The motor 224 is controlled by a motor control circuit 271 of an electric circuit system which is provided for controlling the rotational directions of the motor 224.

As thus arranged, referring to FIGS. 2, 3 and 4, it will be observed that the capstan 24 and the idler 184 are rotated counterclockwise and the idler 182 and the pulley 218 are rotated clockwise in accordance with the counterclockwise rotation of the motor 224. It will be also observed that the gear 154 is rotated counterclockwise in accordance with the clockwise rotation of the motor 224 so as to rotate the switch cam 44 and the triangular cam 56 counterclockwise.

Besides the mechanism and motor control circuit 271 just described, an operation control circuit 273 of an electric circuit system is provided for selective activation of the coils 134, 136, 138 and 140 and for operation of the motor control circuit 271. The operation control circuit 273 operates in response to the switches 52 and 152 and manually operable keys 275 which are provided for selection of the tape transport modes, namely: a play mode; a fast forward mode; a rewind mode; a record mode; and a stop mode.

Figure 5:
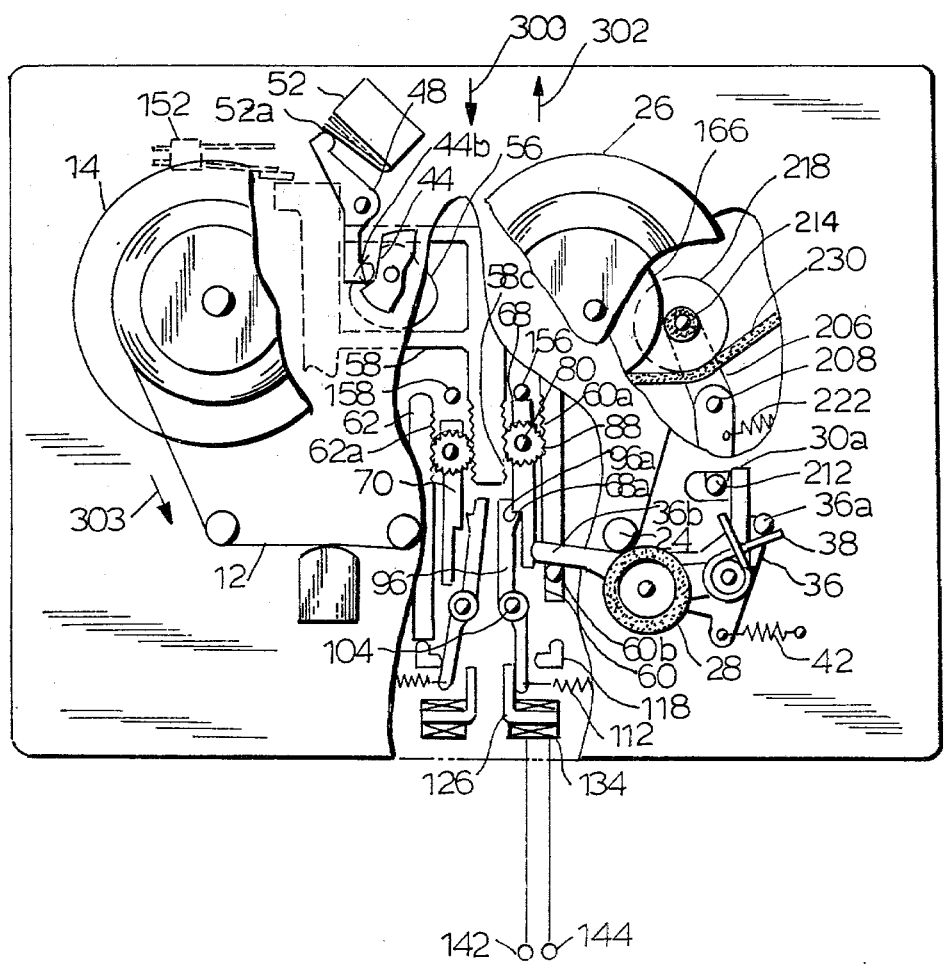
FIG. 5 is a fragmentary view showing the device in a condition for driving the tape recorder in the reproducing state.

FIG. 5 illustrates the mechanism in the play mode. When the play mode is selected by the appropriate manually operable key from among keys 275, the operation control circuit 273 operates the motor control circuit 271 for starting the motor 224 rotating in the clockwise direction and activates the coil 134 for engagement of the lever 96 against the differential rod 68 (see FIG. 2). This activation of the coil 134 is achieved by electrifying the terminals 142 and 144. Then the switch cam 44 and the triangular cam 56 is rotated counterclockwise for moving the actuator 52a and the cam follower 58 respectively from their initial positions shown in FIGS. 1 and 2. The cam follower 58 moves from the first position shown in FIG. 2 to a second position shown in FIG. 5 in response to the rotation of the triangular cam 56 so as to move the play rod 60 in the direction represented by the arrow 302 to the position shown in FIG. 5 since the differential rod 68 is restricted in its movement in the direction represented by the arrow 300. While the differential rod 68 is restricted in its movement, the differential rod 70 can be moved in the direction represented by the arrow 300 in response to the movement of the cam follower 58. Thus, the fast forward rod 62 remains in the position shown in FIG. 5 or 2. Referring to FIG. 2 or 5, it will be understood that the movements or the positions of the differential rods 72 and 74 and therefore of the rewind rod 64 and the record rod 66 in the play mode are the same as those of the differential rod 70 and the fast forward rod 62. During the rotation of the triangular cam 56 from the position shown in FIG. 2 to the position shown in FIG. 5, the edge 48a of the switch lever 48 moves out of the detent face 44a for activation of the switch 52 shown by two-dot chain lines, then it is received by the detent face 44b for deactivation of the switch 52. As for the leaf switch 152, it is deactivated in response to the movement of the cam follower 58 in the direction represented by the arrow 300. Thus, the position of the cam follower 58 is detected by the switches 52 and 152 in a manner such that when the cam follower 58 is in the first position shown in FIG. 2, the switch 52 is deactivated and the leaf switch 152 is activated, and when the cam follower 58 is in the second position shown in FIG. 5 the switch 52 is activated and the leaf switch 152 is deactivated. When the triangular cam 56 reaches the position shown in FIG. 5, the motor 224 is caused to start to rotate in the normal or counterclockwise direction by means of the motor control circuit 271 controlled by the operation control circuit 273 in response to foregoing direction by the switches 52 and 152.

In addition to the foregoing, the lever 36 is moved clockwise by the pin 60b on the play rod 60 when it is moved to the position shown in FIG 5 as aforesaid. This clockwise movement of the lever 36 causes the pressure roller 28 to be pressed by the spring 38 against the tape drive capstan 24 for moving the magnetic tape 12 in a direction represented by the arrow 303 at a constant tape speed, and causes the rubber tire idler 214 to be engaged by the spring 222 with the take-up reel drive turntable 166 for winding the magnetic tape 12 on the take-up reel 26 by means of said frictional coupling means. Thus the foregoing mechanism is shifted from a stop mode position shown in FIG. 1 or 2 into a play mode position shown in FIG. 5.

It will thus be understood from the foregoing operation that one of the respective rods 60, 62, 64 and 66 is moved in the direction represented by the arrow 302 in response to the movement of the cam follower 58 in the direction represented by the arrow 300 only when one of the respective coils 134, 136, 138 and 140, which corresponds to said one of the respective rods, is activated.

It will also be understood from the foregoing operation that the machanism can be shifted from the play mode into the stop mode as follows. When the stop mode is selected by the manually operable key from among keys 275, the operation control circuit 273 operates the motor control circuit 271 for starting the motor 224 rotating in the clockwise direction, while the magnetic coil 134 is activated. Thus, the triangular cam 56 is rotated counterclockwise and the cam follower 58 is moved from the second position shown in FIG. 5 to the first position shown in FIG. 2. The play rod 60 is moved in the direction represented by the arrow 300 from the position shown in FIG. 5 to the position shown in FIG. 2 in response to the movement of the cam follower 58 since the differential rod 68 is restricted in its movement in the direction represented by the arrow 302 by the stop 156. While the cam follower 58 moves as aforesaid, the switch cam 44 rotates counterclockwise from the position shown in FIG. 5 to the position shown in FIG. 2. The switch 52 is activated and then is deactivated, and the leaf spring 152 is activated in response to the rotation of the switch cam 44 for detection of the first position of the cam follower 58 so as to stop the motor 224 rotating in the clockwise direction. In response to the movement of the play rod 60, the pressure roller 28 and the rubber tire idler 214 are moved due to the biasing force of the spring 42 from their position shown in FIG. 5 to their position shown in FIG. 2 for disengagement from the tape drive capstan 24 and the reel drive turntable 166.

It is to be noted that these disengagements are achieved with a speed of movement such that the movement of the play rod 60 causes the pressure roller 28 and the rubber tire idler 214 to move more slowly than if it were to move due to biasing force of the spring 42 alone. Thus, the mechanism achieves a smooth and quiet operation since the movements due to the spring forces follow the movement of the cam follower 58 driven by the motor 224.

The magnetic coil 134 is deactivated by the operation control circuit 273 in response to the operation of the switches 52 and 152 when the triangular cam 56 reaches the position shown in FIG. 2 so as to restore the lever 96 from the position shown in FIG. 5 to the position shown in FIG. 2.

It is to be noted that this restoration of the lever 96 is achieved quietly, although the lever 96 is moved by the spring 112, since the biasing force is relatively small but is enough for dislocation of the lever 96 which is lightly mounted on the base chassis 10 for pivotal movement.

It is also to be noted that the clockwise movement of the lever 96 is achieved with less electric power to the magnetic coil 134 which is small since the foregoing biasing force due to the spring 112 is small.

It is further to be noted that the motor 224 is highly efficiently used for driving the mechanism since the operation for transporting the magnetic tape 12 and the operation for shifting the tape transport mechanism into and out of operation are achieved by the normal rotational driving force and the reverse rotational driving force of the motor 224 respectively by means of the pair of one-way clutches. This highly efficient driving by the motor 224 causes the tape transport mechanism to be shifted into and out of operation.

It is still further to be noted that the tape transport mechanism is shifted into and out of operation during the constant engagement of the cam follower 58 with the play rod 60. This constant engagement causes the mechanism to operate with reliability, smoothness and quietness.

Figure 6:
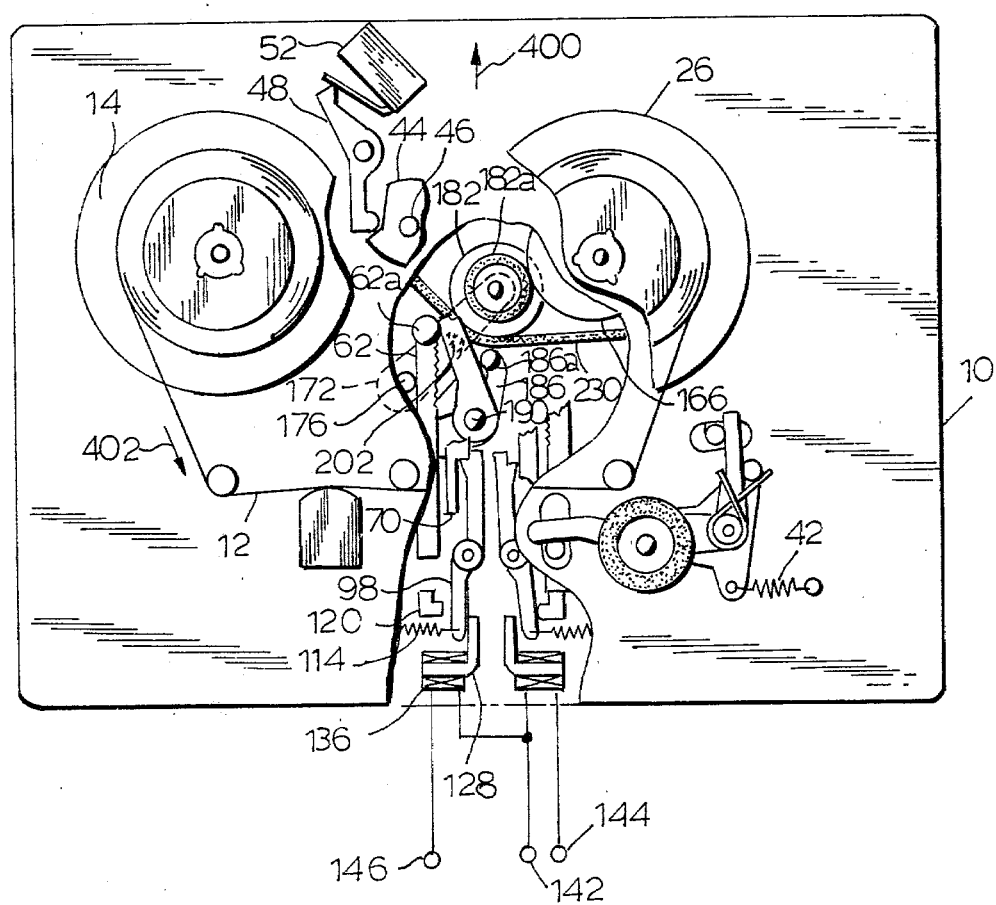
FIG. 6 is a fragmentary view showing the device in a condition for driving the tape recorder in the fast forward state.

FIG. 6 illustrates the mechanism in the fast forward mode. When the fast forward mode is selected by the manually operable key, the operation control circuit 273 operates the motor control circuit 271 for starting the motor 224 rotating in the clockwise direction as in the case of the play mode and activates the magnetic coil 136 for engagement of the lever 98 against the differential rod 70. It will be understood that similar to the operation of the mechanism in shifting from the stop mode to the play mode, the fast forward rod 62 moves in the direction represented by the arrow 400 from the position shown in FIG. 2. In response to the movement of the fast foward rod 62, the lever 186 is moved clockwise by the pin 62b on the fast forward rod 62 so as to engage the rubber tire 182a of the idler 182 against the take-up reel drive turntable 166. This engagement is achieved by the biasing force of the spring 202 for moving the arm 172 clockwise since the arm 172 is limited in its movement to a position shown in FIG. 6 adjacent to the projection 186a for creating a small gap therebetween. When the fast forward rod 62 reaches the position shown in FIG. 6, the motor is caused to start to rotate in the counterclockwise direction by means of the motor control circuit 271 and other means which operate just as in the case of the play mode operation. Thus, the magnetic tape 12 is moved in a direction represented by the arrow 402 at a faster speed than that the play mode.

When the stop mode is selected by the appropriate manually operable key when the apparatus is in this fast forward mode, the fast forward rod 62 is moved from the position shown in FIG. 6 to the position shown in FIG. 2.

It will be understood in referring to the operation of the mechanism being shifted from the play mode to the stop mode that the way to move the fast forward rod 62 is the same as the way to move the play rod 60. In response to the movement of the fast forward rod 62, the arm 172 and the lever 186 are restored to their positions shown in FIG. 3 by the biasing force of the spring 196 (not shown in FIG. 6 but in FIG. 7). When the above restoration has been completed and the switch cam 44 attains the position shown in FIG. 1, the magnetic coil 136 is deactivated by the operation control circuit 273, then the lever 98 is restored to the position shown in FIG. 2. Thus, the mechanism is shifted from the fast forward mode shown in FIG. 6 to the stop mode shown in FIG. 2 or 3.

Figure 7:
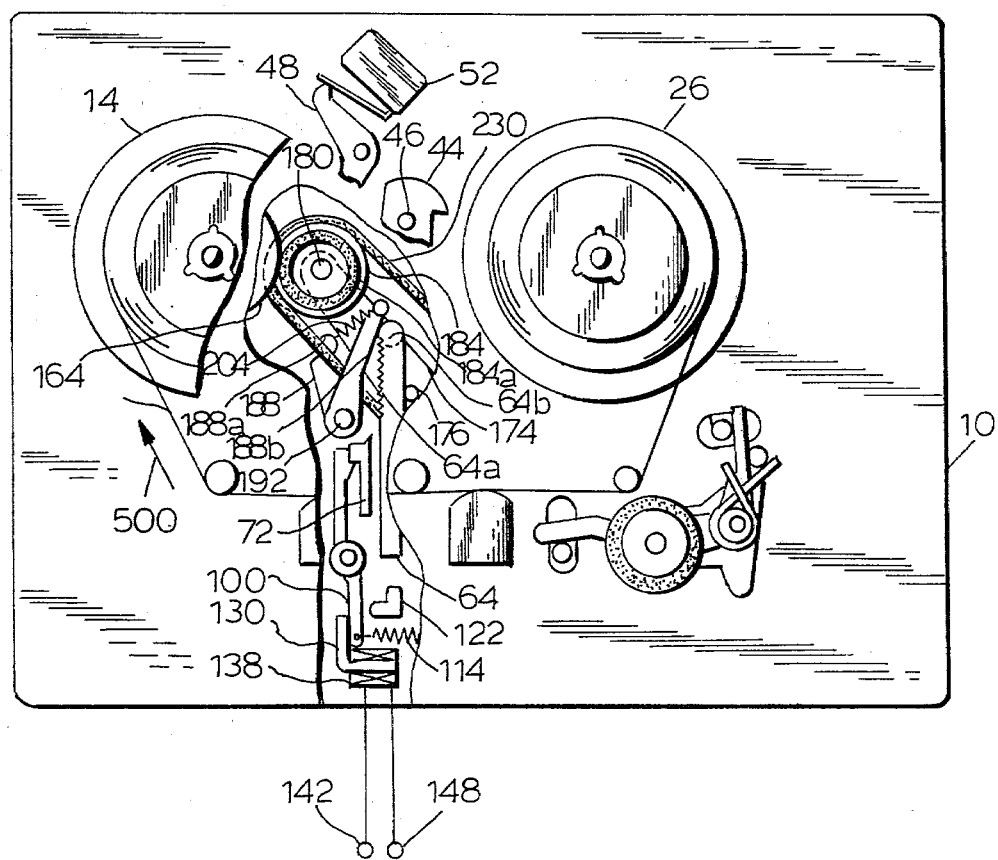
FIG. 7 is a fragmentary view showing the device in a condition for driving the tape recorder in the rewind state.

FIG. 7 illustrates the mechanism in the rewind mode. When the rewind mode is selected by the manually operable key, the operation control circuit 273 operates the motor control circuit 271 for starting the motor 224 rotating in the clockwise direction, as in the case of the play mode and the fast forward mode, and activates the magnetic coil 138 for engagement of the lever 100 against the differential rod 72. It will be understood that similar to the operation of the mechanism in shifting from the stop mode to the play mode or the fast forward mode, the rewind rod 64 moves from the position shown in FIG. 2 to the position shown in FIG. 7. In response to the movement of the rewind rod 64, the lever 188 is moved counterclockwise by the pin 64b on the rewind rod 64 so as to engage the rubber tire 184a of the idler 184 against the supply reel drive turntable 164. This engagement is achieved by the biasing force of the spring 204 for moving the arm 174 counterclockwise since the arm 174 is limited in its movement to a position shown in FIG. 7 adjacent to the projection 188a for creating a small gap therebetween. When the rewind rod 64 reaches the position shown in FIG. 7, the motor is caused to start to rotate in the counterclockwise direction by means of the motor control circuit and other means which operate just as in the case of the play or the fast forward mode operation. Thus, the magnetic tape 12 is moved in the direction represented by the arrow 500 at a faster speed than that of the play mode.

When the stop mode is selected by the appropriate manually operable key during this rewind mode, the rewind rod 64 is moved from the position shown in FIG. 7 to the position shown in FIG. 2. It will be understood from reference to the operation of the mechanism shifted from the play mode to the stop mode that the way to move the rewind rod 64 is the same as the way to move the play rod 60. In response to the movement of the rewind rod 64, the arm 174 and the lever 188 are restored to their positions shown in FIG. 3 by a biasing force of the spring 200 (not shown in FIG. 7 but in FIG. 3). When the above restoration has been completed and the switch cam 44 attains the position shown in FIG. 1, the magnetic coil 138 is deactivated by the operation control circuit 273, then the lever 100 is restored to the position shown in FIG. 2. Thus, the mechanism is shifted from the rewind mode shown in FIG. 7 to the stop mode shown in FIG. 2 or 3.

As for an operation of the record rod 66 shown in FIG. 2, it will be described briefly in referring to the foregoing description. The record rod 66 is provided for shifting a record-reproducing switch (not shown) connected to an audio system, which may be of standard form, including the record head 18 and the reproducing head 20. The record-reproducing switch is so connected to the record rod 66 that it is shifted to a record position when the record rod 66 moves in the direction represented by the arrow 76 shown in FIG. 2 and that it is restored to a reproducing position when the rod 66 is restored to the position shown in FIG. 2. It will be easily understood that the above movement or restoration of the record rod 66 is similar to that of the play rod 60. In addition, the operation control circuit activates the magnetic coil 140 when the record mode is selected by the manually operable key.

It is to be noted notes that the mechanism can be constructed compactly and simply as best shown in FIG. 2.

It is apparent that various modifications of the above described example may be made without departing from the spirit of the invention. The above described specific example is intended merely to illustrate the various facets in a certain selective embodiment of the invention, the scope of which it is intended shall be limited only by the following claims.

What is claimed is:

1. An operation control device for a magnetic tape record and/or reproducing apparatus having a tape transport mechanism, said operation control device comprising: a power means; a first displacement means driven by said power means; a second displacement means for shifting said tape transport mechanism of said apparatus into and out of operation; a coupling means for constantly engaging said first displacement means with said second displacement means, said coupling means being positionable between an operative position where said second displacement means is moved in response to the movement of said first displacement means and an inoperative position where said second displacement means remains unmoved in response to the movement of said first displacement means; a control means selectively and operatively activated for engagement with said coupling means for placing said coupling means in said operative position thereof, whereby said tape transport mechanism is shifted into and out of operation in response to the activation of said control means under said constant engagement of said first displacement means with said second displacement means.

2. An operation control device according to claim 1, wherein said power means includes a motor and a cam means driven by said motor for displacing said first displacement means.

3. An operation control device according to claim 1, wherein said coupling means comprises a first rack means formed on said first displacement means, a second rack means formed on said second displacement means, and a pinion means included in said coupling means and adapted to mesh said first and second rack means respectively.

4. An operation control device according to claim 1 or claim 3, wherein said coupling means comprises a movable means having said pinion means rotatably thereon, and wherein said control means comprises a restricting means engagable with said movable means for restricting the movement of said movable means, and an electro-magnetic means connected to said restricting means for operating said restricting means upon energization thereof for bringing said coupling means into said operative position thereof in response to the energization of said electro-magnetic means.

5. An operation control device for a magnetic tape record and/or reproducing apparatus having a tape transport mechanism shiftable into and out of at least play, fast forward and rewind modes, said operation control device comprising: a shifting means for shifting said tape transport mechanism into and out of said modes; a reversible motor; a motor control means connected to said motor for controlling the directions of rotation of said motor; a power control means connected to said motor for transmitting the drive power of said motor during rotation in the normal direction to said tape transport mechanism and to transmit the drive power of said motor during rotation in the reverse direction to said shifting means; said shifting means having a first displacement means, a power transmitting means connected between said power control means and said first displacement means for transmitting said motor power to said first displacement, a second displacement means including displacement elements shiftable to at least play, fast forward and rewind mode shift positions thereof for shifting said tape transport mechanism into and out of said modes, a coupling means for engaging said first displacement means with said second displacement means, said coupling means being positionable to at least play, fast forward and rewind mode coupling positions thereof, a coupling control means for engagement with said coupling means for placing said coupling means into a selected one of said coupling positions, an operation control electric circuit connected to said coupling control means and said motor control means for activating said coupling control means and said motor control means, whereby said displacement elements are shifted into and out of the selected shift positions in response to the activation of said coupling control means activated by said operation control electric circuit, and said tape transport mechanism and said shifting means are driven by said motor respectively in accordance with the normal and reverse rotational directions of said motor.

6. An operation control device according to claim 5, wherein said power control means comprises a pair of one-way clutches.

* * * * *